United States Patent
Cockerill et al.

(10) Patent No.: US 8,783,233 B2
(45) Date of Patent: Jul. 22, 2014

(54) CHARGE AIR COOLER WITH DUAL FLOW PATH CONDUIT

(75) Inventors: Charles A. Cockerill, Brighton, MI (US); Shuya Shark Yamada, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/597,070

(22) Filed: Aug. 28, 2012

(65) Prior Publication Data

US 2014/0060500 A1 Mar. 6, 2014

(51) Int. Cl.
*F02M 31/20* (2006.01)

(52) U.S. Cl.
USPC ............... 123/542; 123/563; 60/598

(58) Field of Classification Search
USPC ............... 123/540, 542, 563, 184.21, 184.52, 123/184.56, 188.1; 261/151; 60/599, 600, 60/598
See application file for complete search history.

(56) References Cited

U.S. PATENT DOCUMENTS

| | | | |
|---|---|---|---|
| 4,562,697 A * | 1/1986 | Lawson | 60/599 |
| 6,742,335 B2 * | 6/2004 | Beck et al. | 60/605.2 |
| 6,786,210 B2 * | 9/2004 | Kennedy et al. | 123/568.12 |
| 7,011,080 B2 * | 3/2006 | Kennedy | 123/568.12 |
| 7,530,336 B2 * | 5/2009 | Brecheisen, II | 123/25 A |
| 7,740,010 B2 | 6/2010 | Fulton et al. | |
| 7,980,076 B2 * | 7/2011 | Buia et al. | 60/599 |
| 8,061,135 B2 * | 11/2011 | Rutherford | 60/599 |
| 8,453,446 B2 * | 6/2013 | Onishi et al. | 60/605.2 |
| 8,522,551 B2 * | 9/2013 | Tomita et al. | 60/612 |
| 2006/0016439 A1 | 1/2006 | Tussing et al. | |
| 2007/0261400 A1 * | 11/2007 | Digele et al. | 60/320 |
| 2008/0202725 A1 * | 8/2008 | Kardos et al. | 165/51 |
| 2010/0065024 A1 | 3/2010 | Kardos et al. | |
| 2010/0077995 A1 | 4/2010 | Buia et al. | |
| 2010/0083941 A1 * | 4/2010 | Kardos | 123/542 |
| 2010/0212638 A1 * | 8/2010 | Rado et al. | 123/51 R |
| 2010/0229549 A1 * | 9/2010 | Taylor | 60/599 |
| 2011/0094219 A1 * | 4/2011 | Palm | 60/599 |
| 2011/0107760 A1 | 5/2011 | Quinn et al. | |
| 2011/0108012 A1 * | 5/2011 | Bryant et al. | 123/568.11 |
| 2011/0232598 A1 * | 9/2011 | Harada et al. | 123/184.47 |
| 2011/0247320 A1 * | 10/2011 | Ruckwied et al. | 60/299 |
| 2012/0017877 A1 * | 1/2012 | Laube et al. | 123/542 |
| 2013/0000611 A1 * | 1/2013 | Vigild et al. | 123/542 |
| 2013/0019845 A1 * | 1/2013 | Meyer | 123/542 |

FOREIGN PATENT DOCUMENTS

| | | | |
|---|---|---|---|
| EP | 2161430 A1 * | 3/2010 | |
| JP | 2000130172 A | 5/2000 | |
| JP | 2005226476 A * | 8/2005 | |

OTHER PUBLICATIONS

Machine translation of Detailed Description for JP2005226476; Noda, Yoshio; obtained from espacenet.com; pp. 1-10.*

* cited by examiner

*Primary Examiner* — Noah Kamen
*Assistant Examiner* — Grant Moubry
(74) *Attorney, Agent, or Firm* — Julia Voutyras; Alleman Hall McCoy Russell & Tuttle LLP

(57) ABSTRACT

An engine cooling system comprises a charge air cooler having an inlet, a plurality of heat exchange passages fluidically coupled to the inlet, and an outlet fluidically coupled to the heat exchange passages, and a conduit coupled to the outlet and an intake manifold of an engine, the conduit divided to include a first and second flow path to the intake manifold with a valve positioned at an inlet of the first flow path. In this way, accumulated condensate in the charge air cooler may be moved to the engine during low intake velocity conditions.

20 Claims, 4 Drawing Sheets

CHARGE AIR COOLER WITH DUAL FLOW PATH CONDUIT

FIELD

The present disclosure relates to an internal combustion system.

BACKGROUND AND SUMMARY

Turbocharged and supercharged engines may be configured to compress ambient air entering the engine in order to increase power. Because compression of the air may cause an increase in air temperature, a charge air cooler may be utilized to cool the heated air thereby increasing its density and further increasing the potential power of the engine. If the humidity of the ambient air is high, however, condensation (e.g., water droplets) may form on any internal surface of the charge air cooler that is cooler than the dew point of the compressed air. During transient conditions such as hard vehicle acceleration, these water droplets may be blown out of the charge air cooler and into the combustion chambers of the engine resulting in increased potential for engine misfire, loss of torque and engine speed, and incomplete combustion, for example.

One approach for reducing the amount of condensation entering the combustion chambers is disclosed in US Patent Application Publication 2011/0094219 A1. In the cited reference, a condensation trap for a charge air cooler that reduces the rate at which condensation enters the combustion chambers of the engine is disclosed. The condensation trap includes a reservoir for collecting the condensate and a tube for releasing the condensate back to the outlet duct.

The inventors herein have recognized various issues with the above system. In particular, the condensation trap is positioned downstream of the charge air cooler and thus can only collect condensation downstream from an outlet of the charge air cooler. This configuration may not adequately address condensation trapped within the charge air cooler. Furthermore, condensation traps necessitate additional componentry that may increase the cost and the packaging space of the charge air cooler.

As such, one example approach to address the above issues includes an engine cooling system, comprising a charge air cooler having an inlet, a plurality of heat exchange passages fluidically coupled to the inlet, and an outlet fluidically coupled to the heat exchange passages, and a conduit coupled to the outlet and an intake manifold of an engine, the conduit divided to include a first and second flow path to the intake manifold with a valve positioned in the first flow path.

By providing a conduit having two flow paths, the velocity of the intake air as it exits the charge air cooler may be modulated. In one example, the valve may be configured to be closed during lower intake velocity conditions, such as low load. The closed valve may block the inlet of the first flow path, thus resulting in the intake air flowing only through the second flow path. In doing so, the velocity of the intake air increases and accumulated condensate in the charge air cooler may be entrained in the intake air and moved to the intake manifold. This may reduce the accumulation of large amounts of condensate. As engines may be able to tolerate small amounts of condensate within the intake air without misfiring, the approach described above provides a mechanism for passing small amounts of condensate to the engine and reduces the likelihood of engine misfire due to large amounts of condensate reaching the engine.

As the closed valve blocks part of the flow path of the conduit, it also increases the pressure drop across the outlet of the charge air cooler. To prevent a large pressure drop that may occur during high velocity conditions (and that may result in inefficient engine air flow), the valve may open during high intake air velocity conditions. During high intake air velocity conditions, the intake air is already traveling with increased velocity, and the velocity of the intake air need not be further increased in order to entrain the condensate within the intake air. Thus, when the valve is both open and closed, accumulated condensate may be moved to the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
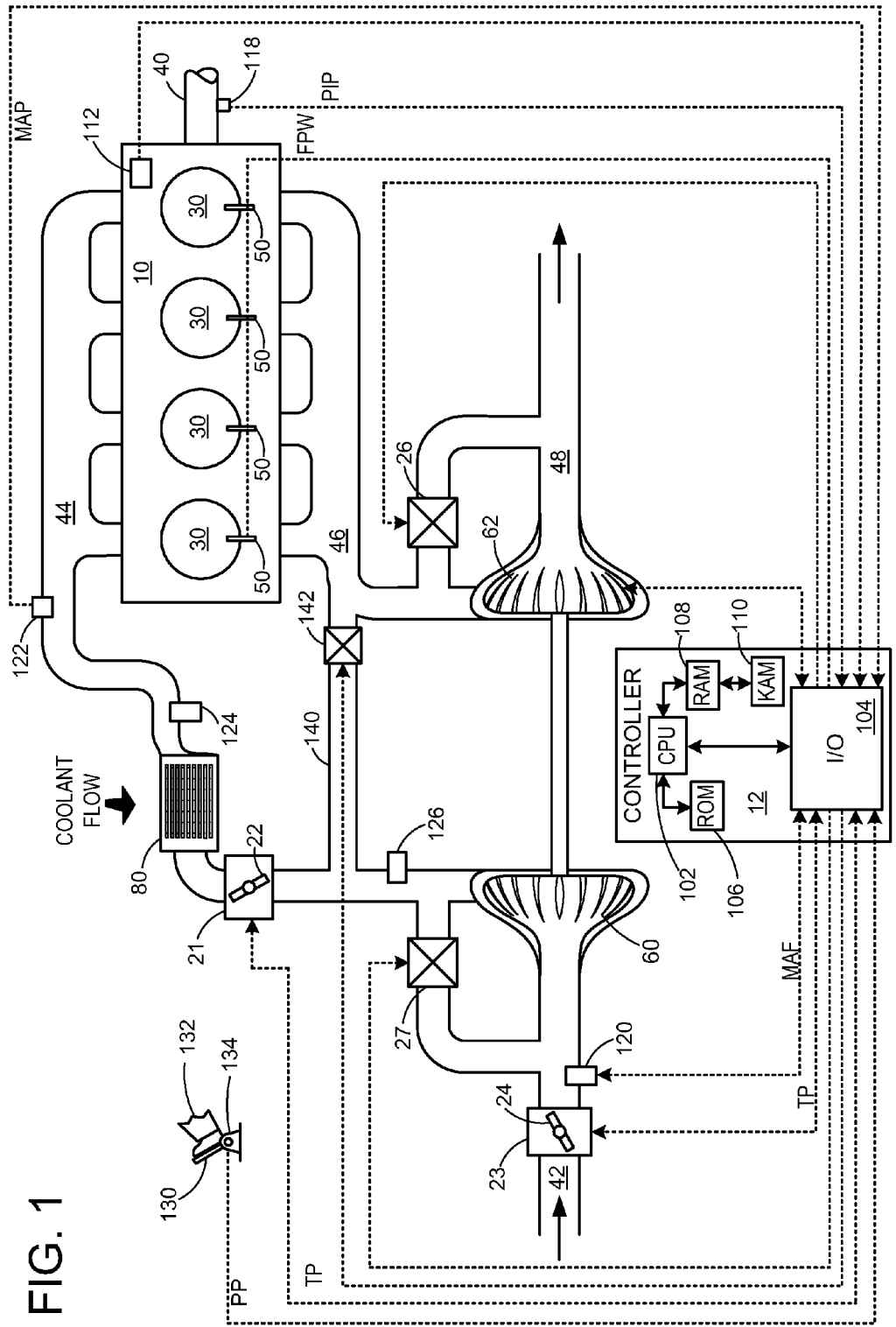
FIG. 1 is a schematic diagram of an example engine including a charge air cooler.

To reduce the likelihood that a large amount of accumulated condensate will travel from a charge air cooler to an engine, potentially causing misfire and other issues, the conduit coupling the charge air cooler to the intake manifold may include a divider to provide a dual flow path. One of the two flow paths may be selectively closed via a valve positioned near the outlet of the charge air cooler. When the valve is open, intake air may travel through the entirety of the conduit, via both air flow paths. When the valve is closed, intake air is blocked from flowing though one of the flow paths, and thus travels through a single flow path. By restricting the flow of the intake air to a single air flow path, the velocity of the intake air increases. The increased velocity of the intake air may entrain small amounts of the accumulated condensate, moving it to the engine where it is combusted. In this way, the build-up of large amounts of condensate, which may problematic, can be avoided. FIG. 1 shows an example including a charge air cooler, which is shown in greater detail in FIGS. 2A and 2B. FIG. 3 is a flow chart illustrating a method for controlling condensate in the charge air cooler.

First, FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust manifold 46 to exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30; however it will be appreciated that port injection is also possible. Fuel may be delivered to fuel injector 50 by a fuel system (not shown) including a fuel tank, a fuel pump, and a fuel rail.

Intake passage 42 may include throttle 21 having a throttle plate 22 to regulate air flow to the intake manifold. In this particular example, the position of throttle plate 22 may be varied by controller 12 to enable electronic throttle control (ETC). In this manner, throttle 21 may be operated to vary the intake air provided to combustion chamber 30 among other engine cylinders. In some embodiments, additional throttles may be present in intake passage 42. For example, as depicted in FIG. 1, an additional throttle 23 having a throttle plate 24 is located upstream of compressor 60.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger. When operable, the EGR system may induce the formation of condensate from the compressed air, particularly when the compressed air is cooled by the charge air cooler, as described in more detail below.

Engine 10 may further include a compression device such as a turbocharger or supercharger including at least a compressor 60 arranged along intake passage 42. For a turbocharger, compressor 60 may be at least partially driven by a turbine 62, via, for example a shaft, or other coupling arrangement. The turbine 62 may be arranged along exhaust passage 48. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12.

Further, exhaust passage 48 may include wastegate 26 for diverting exhaust gas away from turbine 62. Additionally, intake passage 42 may include a compressor recirculation valve (CRV) 27 configured to divert intake air around compressor 60. Wastegate 26 and/or CRV 27 may be controlled by controller 12 to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger. As described in more detail below, a conduit coupled to charge air cooler 80 may include a valve to selectively modulate the flow velocity of intake air traveling through the conduit to control condensation formation within the charge air cooler.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 for performing various functions to operate engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40.

Other sensors that may send signals to controller 12 include a temperature sensor 124 at the outlet of the charge air cooler 80, and a boost pressure sensor 126. Other sensors not depicted may also be present, such as a sensor for determining the intake air velocity at the inlet of the charge air cooler, and other sensors. In some examples, storage medium read-only memory 106 may be programmed with computer readable data representing instructions executable by processor 102 for performing the methods described below as well as other variants that are anticipated but not specifically listed.

Figure 2A:
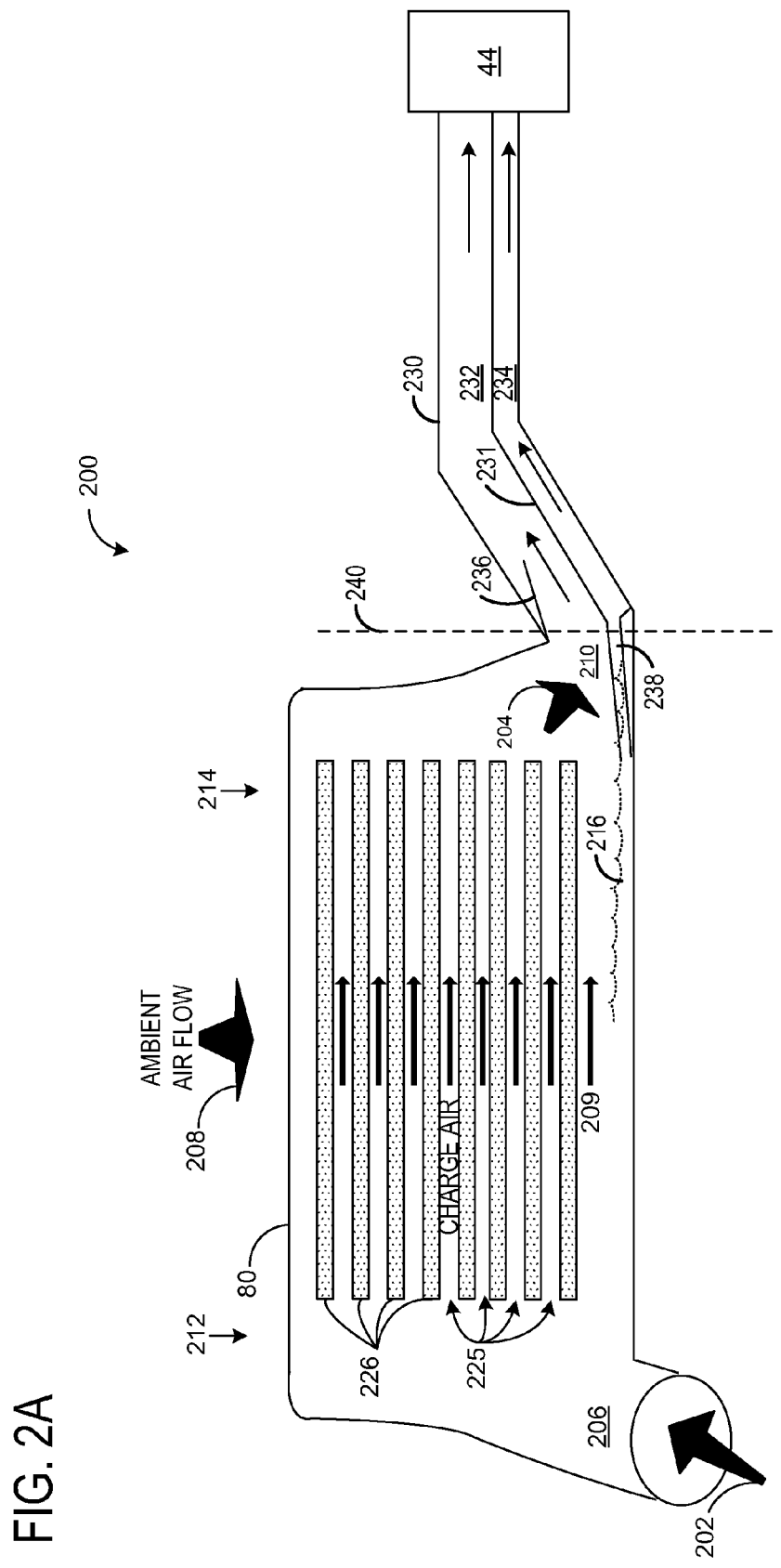
FIGS. 2A and 2B are schematic diagrams of the charge air cooler of FIG. 1 including a dual flow path conduit.
Figure 2B:
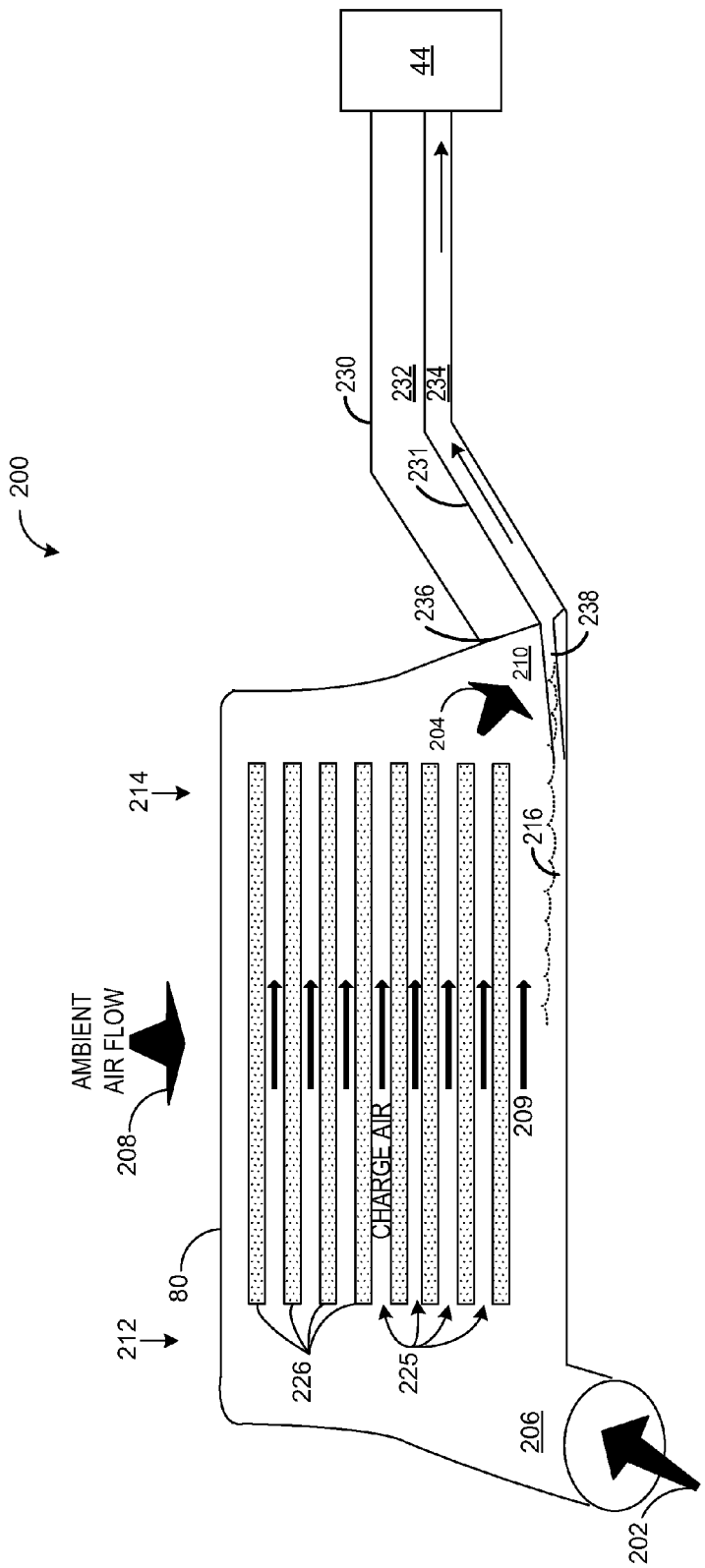
Figure 3:
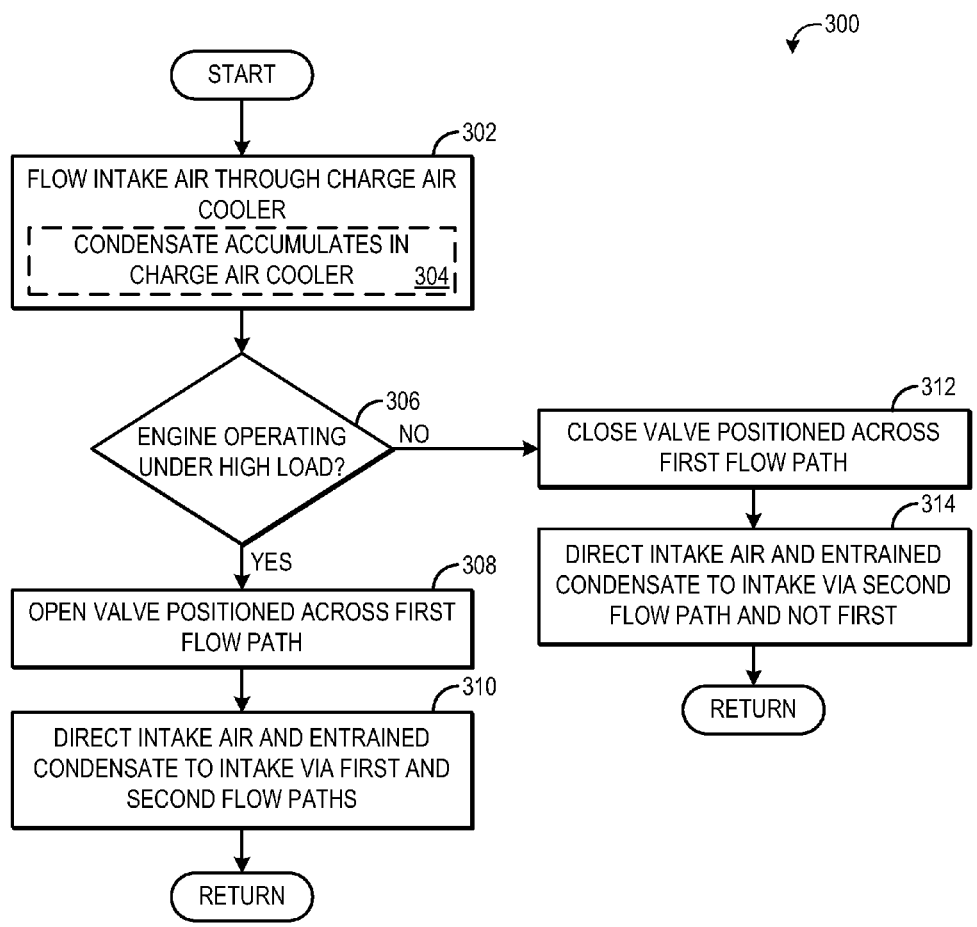
FIG. 3 is a flow chart illustrating a method for flowing intake air via a dual flow path conduit.

Referring now to FIGS. 2A and 2B, an embodiment of a charge air cooling system is illustrated. FIGS. 2A and 2B show a front perspective view of a charge air cooler system 200 including a charge air cooler 80. The charge air cooler system may be utilized to discharge water droplets from the charge air cooler which may accumulate as the result of the high ambient air humidity. This may occur, for example, on surfaces of heat exchange passages within the charge air cooler when the surfaces are at a temperature less than the dew point of the ambient air entering the cooler. When condensation forms on these cooler surfaces it may pool at a low point of the charge air cooler, for example.

As shown, the direction of engine airflow entering charge air cooler 80 is indicated generally by arrow 202, and engine airflow exiting charge air cooler 80 is indicated generally by arrow 204. However, it will be appreciated that engine air may enter and exit charge air cooler 80 at other airflow directions and the engine airflow as indicated by arrows 202 and 204 is provided as one non-limiting example. Likewise, other charge air cooler geometries than those depicted in FIGS. 2A and 2B are possible without departing from the scope of this disclosure.

As introduced above, engine air may enter via a first engine air passage 206 upstream from charge air cooler 80. Engine air may then be cooled via heat exchange with ambient air, indicated generally at 208, and may then exit via a second engine air passage 210 downstream from charge air cooler 80. In other words, engine air enters at a hot side 212 of the charge air cooler and exits at a cold side 214 of the charge air cooler (directionality of charge air flow indicated generally by arrows 209), wherein 'hot' and 'cold' indicate a relative temperature of the engine air as it passes through the charge air cooler. In this way, ambient air 208 cools compressed engine air via heat exchange as the engine air passes through the charge air cooler. However, the compressed engine air entering the charge air cooler may condense, as described above. In this sense, first engine air passage 206 may deposit condensate within the charge air cooler.

As shown, charge air cooler 80 may include a plurality of heat exchange passages 225 and a plurality of ambient air passages 226. Heat exchange passages 225 may provide a conduit for charge air to be cooled by ambient air cross-flow passing through the plurality of ambient air passages 226. In this way, compressed engine air is cooled upstream from the combustion chambers.

Charge air cooler system 200 also includes a conduit 230 coupled to the second engine air passage 210. Conduit 230 leads to the intake manifold 44 of the engine. Thus, conduit 230 is coupled to both charge air cooler 80 and intake manifold 44. As conduit 230 is configured to deliver intake air to the engine, it may be referred to as an intake passage. Conduit 230 includes a divider 231 that portions conduit into two air flow paths, first flow path 232 and second flow path 234. Divider 231 may run the entire length of conduit 230 and act as a common interior dividing wall that is shared between the first and second flow paths. Thus, conduit 230 may be fully divided the entire length from the charge air cooler to the intake manifold, and in some embodiments, without any intervening openings. Both air flow paths are fluidically coupled to the charge air cooler 80 and to the intake manifold 44 such that charge air from the charge air cooler 80 may travel through both first flow path 232 and second flow path 234 to reach the intake manifold 44. As shown in FIGS. 2A and 2B, first flow path 232 is vertically above second flow path 234. A vertical axis 240 is depicted in FIG. 2A to illustrate the relationship between the first flow path 232 and the second flow path 234. As used herein, vertical is with respect to the ground and the wheels of the vehicle in which charge air cooling system 200 is installed. Furthermore, as depicted in FIGS. 2A and 2B, first flow path 232 has a larger cross-section diameter than second flow path 234. However, in other embodiments, second flow path 234 may have a larger diameter, or the flow paths may have equal diameters.

First flow path 232 may be selectively opened by a valve 236 positioned across the first flow path 232. As illustrated herein, valve 236 is positioned at the inlet of first flow path 232 where conduit 230 is coupled to charge air cooler 80. However, valve 236 may be positioned at other suitable locations. In one example, valve 236 may be positioned in second flow path 234 rather than first flow path 232. In another example, valve 236 may be positioned at a different location within first flow path 232, such as in the middle of conduit 230, at the outlet of the conduit 230, inlet of the intake manifold 44, etc.

Valve 236 may be a spring-loaded flapper valve configured to be closed under low to mid load conditions and opened under high load conditions. For example, the spring tension acting on valve 236 may be high enough to maintain valve 236 in a closed position when charge air velocity is relatively low (e.g., under lower load conditions). When charge air velocity is relatively high (e.g., under high load conditions), the higher velocity of the charge air acting on the spring may force the valve 236 open. FIG. 2A shows the valve 236 in the open position, with charge air flowing to the intake manifold 44 via both first flow path 232 and second flow path 234.

When closed, valve 236 may act to block first flow path 232 from receiving charge air, thus directing all charge air through second flow path 234, as shown in FIG. 2B. In doing so, the velocity of charge air traveling through the second flow path 234 increases. The increased air velocity entrains condensate that has accumulated on the bottom surface of the charge air cooler 80. For example, accumulated condensate 216 may pool at a low point of charge air cooler 80, such as along the bottom surface of charge air cooler. Accumulated condensate 216 may also pool along surfaces of the heat exchange passages 225 and/or at collections point in conduit 230 (such as bends). This condensate may be swept out of the charge air cooler under high velocity conditions, such as high load. However, during lower load conditions, the velocity of the charge air may not be high enough to move the accumulated condensate. By selectively closing off part of the flow path from the charge air cooler 80 to the intake manifold 44 with the closed valve 236 (e.g., by selectively closing off first flow path 232), the increased velocity of the charge air traveling through the second flow path 234 may remove the condensate, even during lower load conditions. During high load conditions, when charge air velocity is higher, a closed valve 236 may present a large pressure drop, hindering efficient flow. Thus, valve 236 is configured to open under high load conditions.

Also depicted in FIGS. 2A and 2B is a condensation collection tube 238. Condensation collection tube 238 may be coupled to the second flow path 234 and include an inlet positioned near a low point of the charge air cooler 80. The condensation collection tube 238 may further narrow the flow path of charge air exiting the charge air cooler 80. In this way, condensation collection tube 238 may act as a straw to funnel charge air with entrained condensate into the second flow path 234 and to the intake manifold 44.

It will be appreciated that the above description is non-limiting and components of the charge air cooler system 200 may be of other suitable geometric configurations than those depicted in FIGS. 2A and 2B. Additionally, it will be appreciated that features of charge air cooler system 200 may embody configurations other than those depicted without departing from the scope of this disclosure. For example, condensation collection tube 238 may be omitted, or it may be coupled to first flow path 232 rather than second flow path 234. Further, while valve 236 is depicted as a spring-loaded flapper valve configured to open or close based on the velocity of the charge air, other valve configurations are possible. In one example, valve 236 may be controlled by controller 12 to selectively open or close based on engine operating conditions. Valve 236 may be an on-off valve with a fully open and fully closed position, or it may be a continuously variable valve with a plurality of restriction points.

In another example, more than two flow paths are possible. The conduit may contain three or more flow paths, and one or more of the flow paths may be controlled via a valve as described above. Alternatively, only one flow path may be provided, and the valve may be configured as a variable position valve that can regulate the restriction level of the opening of the flow path to change the velocity of the air traveling through the conduit.

As shown in FIGS. 2A and 2B, divider 231 runs the entire length of conduit 230, from the outlet of charge air cooler 80 to in the inlet of intake manifold 44. As such, first flow path 232 and second flow path 234 share a common interior dividing wall. Further, in some embodiments, no componentry (other than valve 236), additional flow paths, or openings are positioned within conduit 230, and thus first and second paths 232, 234 extend from charge air cooler 80 to intake manifold 44 without interruption. However, in other embodiments, additional componentry may be positioned between the charge air cooler and the intake manifold, such as throttles, various sensors, another turbocharger, additional charge air cooler, etc. If additional components are present, the conduit between the charge air cooler and downstream component may include multiple flow paths while the conduit from the downstream component to the intake manifold may only include one flow path, or the conduit from the downstream component to the intake manifold may also include multiple flow paths.

Thus, the systems described above provide for an engine system, comprising a charge air cooler; an intake manifold; a conduit coupling the charge air cooler to the intake manifold, the conduit divided into a first flow path and a second flow path; a valve to selectively block intake air from flowing through the first flow path; and a condensation collection tube coupled to the second flow path.

The charge air cooler may comprise an inlet configured to admit intake air, a plurality of heat exchange passages to cool the intake air, and an outlet to discharge the intake air, the outlet fluidically coupled to the conduit. The condensation collection tube may comprise an inlet positioned within the charge air cooler and an outlet fluidically coupled to the second flow path. The inlet of the condensation collection tube may positioned near a low point of the charge air cooler. The valve may be a spring-loaded flapper valve configured to open during high intake air velocity conditions and close during low intake air velocity conditions. The system may further comprise a controller including instructions to open the valve during high load engine operation and close the valve during low to mid load engine operation.

Turning to FIG. 3, a method 300 for controlling condensate in a charge air cooler is depicted. Method 300 may be carried out by a controller, such as controller 12, in order to control a valve positioned in a conduit coupling the charge air cooler to an intake manifold of an engine. As explained previously, the conduit may include a dual flow path for directing intake air to the intake manifold, and the valve may be adjusted to modulate flow through the two flow paths. Method 300 includes, at 302, flowing intake air through a charge air cooler. Intake air may be drawn into an intake passage and may be compressed via a turbocharger before passing through the charge air cooler on its way to the engine. In the charge air cooler, the intake air is cooled, further compressing the air. When the intake air is cooled in the charge air cooler, it may deposit condensate on the surfaces of the charge air cooler, when the intake air is relatively cool and humid, for example. The deposited condensate may accumulate at one or more points of the charge air cooler, such as at a vertically lowest point within the charge air cooler. Thus, as indicated at 304, condensate accumulates within the charge air cooler.

At 306, it is determined if the engine is operating at high load. Engine load may be determined via feedback from a MAP sensor, such as sensor 122, as described above with respect to FIG. 1. If it is determined that the engine is operating under high load conditions, method 300 proceeds to 308 to open a valve positioned across a first flow path of the conduit. As explained above with respect to FIGS. 2A and 2B, a valve may be positioned within one flow path of the dual path conduit coupling the charge air cooler to the intake manifold. When the valve is opened, intake air may flow through the first flow path of the dual path conduit. As the second flow path of the dual path conduit does not include a valve or other restriction, when the valve is open, intake air is directed to the intake manifold via the first and second flow paths, as indicated at 310. As further indicated at 310, entrained condensate is also directed to the intake via the first and second flow paths. The condensate that has accumulated on the surfaces of the charge air cooler may be moved to the intake manifold due to the velocity of the charge air as it passes over the condensate. Method 300 then returns.

If high load conditions are not detected at 306, method 300 proceeds to 312 to close the valve positioned across the first flow path. By closing the valve, intake air is blocked from reaching the first flow path and instead flows only through the second flow path. As indicated at 314, intake air is directed to the intake manifold via the second flow path and not the first flow path. Further, entrained condensate is also directed to the intake manifold via the second flow path, as the increased velocity of the intake air as it moves through the second flow path also entrains the condensate into the intake air. Method 300 then returns.

As described above, method 300 actively controls the position of the valve in the dual path conduit in order to either increase the velocity of the intake air through the conduit (when the velocity is relatively low, such as during low load conditions) or to reduce the pressure drop of the intake air as it travels from the charge air cooler to the conduit (when the velocity of the intake air is relatively high, such as during high load conditions). However, method 300 may alternatively be carried out using a passive valve that is configured to be closed under low velocity conditions, and that is pushed open by the intake air under high velocity conditions.

Additionally, in some embodiments, a condensation collection tube may be coupled to the second flow path. Thus, method 300 may optionally include directing intake air through the condensation collection tube before reaching the second flow path. Intake air may be directed through the condensation collection tube when the valve is open and when the valve is closed.

Thus, in one embodiment, a method for an engine comprises during a first condition, flowing intake air from a charge air cooler to an intake manifold via a first flow path and a second flow path; and during a second condition, flowing the intake air from the charge air cooler to the intake manifold via the second flow path and not the first flow path.

An inlet of the second flow path may be vertically below an inlet of the first flow path at a bottom of the charge air cooler, and a cross-sectional diameter of the first flow path may be larger than a cross-sectional diameter of the second flow path. The first condition may comprise high engine load, and the second condition may comprise low to mid engine load, the first and second flow paths contained within a single conduit. Flowing the intake air from the charge air cooler to the intake manifold via the second flow path may further comprise flowing the intake air through a condensation collection tube coupled to the second flow path.

The method may further comprise opening a valve positioned across the first flow path during the first condition and closing the valve to block intake air from flowing through the first flow path during the second condition. The first and second flow paths may share a common interior dividing wall that extends fully from the charge air cooler to the intake manifold, and the method may further comprise entraining accumulated condensate within the intake air and directing the condensate to the intake manifold.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine cooling system, comprising:
a charge air cooler having an inlet, a plurality of heat exchange passages fluidically coupled to the inlet, and an outlet fluidically coupled to the heat exchange passages and positioned at a bottom of the charge air cooler;
a conduit coupled to and between the outlet and an intake manifold of an engine, the conduit divided to include a first and second flow path to the intake manifold with a valve positioned in the first flow path, the valve closed to block an inlet of the first flow path during a first condition and opened during a second condition; and
a throttle positioned upstream of the charge air cooler.

2. The engine cooling system of claim 1, wherein the first flow path and the second flow path are positioned downstream from the charge air cooler and wherein the valve is configured to be closed during low to mid load conditions and opened during high load conditions.

3. The engine cooling system of claim 2, wherein, when the valve is closed, the first flow path is blocked and intake air from the charge air cooler flows through the second flow path.

4. The engine cooling system of claim 2, wherein, when the valve is opened, intake air from the charge air cooler flows through the first and second flow paths and where the valve is passively controlled.

5. The engine cooling system of claim 1, wherein the valve is a spring-loaded flapper valve, and wherein the bottom of the charge air cooler is below a top of the charge air cooler with respect to a vertical axis.

6. The engine cooling system of claim 1, further comprising a condensate collection tube coupled to the second flow path and having an inlet positioned near a bottom surface of the charge air cooler.

7. The engine cooling system of claim 1, wherein the conduit is fully divided entirely from the outlet of the charge air cooler to the intake manifold without intervening openings.

8. The engine cooling system of claim 1, wherein the first flow path and the second flow path share a common interior dividing wall, and wherein a cross-sectional diameter of the first flow path is larger than a cross-sectional diameter of the second flow path and where the second flow path is vertically below the first flow path with respect to a ground and wheels of a vehicle in which the charge air cooler is installed.

9. An engine system, comprising:
a charge air cooler including an outlet positioned at a bottom of the charge air cooler;
an intake manifold;
a conduit coupling the outlet to the intake manifold, the conduit divided into a first flow path and a second flow path by a common interior dividing wall, the first and second flow paths downstream from the charge air cooler;
a flap valve to selectively block intake air from flowing through the first flow path;
a condensation collection tube coupled to the second flow path;
a throttle positioned upstream of the charge air cooler;
the valve closed to block an inlet of the first flow path during a first condition and opened during a second condition.

10. The engine system of claim 9, wherein the charge air cooler comprises an inlet configured to admit intake air, a plurality of heat exchange passages to cool the intake air, and the outlet to discharge the intake air, the outlet fluidically coupled to the conduit.

11. The engine system of claim 9, wherein the condensation collection tube comprises an inlet positioned within the charge air cooler and an outlet fluidically coupled to the second flow path.

12. The engine system of claim 11, wherein the inlet of the condensation collection tube is positioned near a low point of the charge air cooler.

13. The engine system of claim 9, wherein the valve is a spring-loaded flapper valve configured to open during high intake air velocity conditions and close during low intake air velocity conditions.

14. The engine system of claim 9, further comprising a controller including instructions to open the valve during high load engine operation and close the valve during low to mid load engine operation.

15. A method for an engine, comprising:
during a first condition, flowing intake air from an outlet of a charge air cooler to an intake manifold via a first flow path and a second flow path, the outlet positioned at a bottom of the charge air cooler, the first flow path and the second flow path sharing a common interior dividing wall; and
during a second condition, flowing the intake air into the charge air cooler from a throttle and from the outlet to the intake manifold via the second flow path and not the first flow path by closing a flap valve positioned in the first flow path to block the first flow path.

16. The method of claim 15, wherein an inlet of the second flow path is vertically below an inlet of the first flow path at the bottom of the charge air cooler, wherein a cross-sectional diameter of the first flow path is larger than a cross-sectional diameter of the second flow path, and wherein the inlet of the second flow path is downstream from the charge air cooler.

17. The method of claim 15, wherein the first condition comprises high engine load, and wherein the second condition comprises low to mid engine load, the first and second flow paths contained within a single conduit.

18. The method of claim 16, wherein flowing the intake air from the charge air cooler to the intake manifold via the second flow path further comprises flowing the intake air through a condensation collection tube coupled to the second flow path, a cross-sectional diameter of the condensation collection tube smaller than the cross-sectional diameter of the second flow path.

19. The method of claim 15, further comprising opening a valve positioned across the first flow path during the first condition and closing the valve to block intake air from flowing through the first flow path during the second condition.

20. The method of claim 15, wherein the first and second flow paths share a common interior dividing wall that extends fully from the charge air cooler to the intake manifold, and further comprising entraining accumulated condensate within the intake air and directing the condensate to the intake manifold.

\* \* \* \* \*